United States Patent Office 3,321,504
Patented May 23, 1967

3,321,504
REACTION COMPOUNDS OF TETRAMETHYLTETRAZENE WITH ALUMINUM TRIALKYLS AND THEIR AMINE COMPLEXES AND THE PREPARATION THEREOF
Neil R. Fetter, Arlington, Calif., and Bodo K. W. Bartocha, Indian Head, Md., assignors to the United States of America as represented by the Secretary of the Navy
No Drawing. Filed Aug. 23, 1962, Ser. No. 219,081
8 Claims. (Cl. 260—448)

The invention described herein may be manufactured and used by or for the Government of the United States of America for governmental purposes without the payment of any royalties thereon or therefor.

The present invention relates to new aluminum-nitrogen compounds derived from the reactions of tetramethyltetrazene with aluminum trialkyls and their amine complexes and to the preparation thereof.

It is an object of the present invention to provide a group of novel aluminum-nitrogen compounds that have use as high energy propellant binders.

Another object of this invention is to provide a process for preparing a group of novel aluminum-nitrogen compounds which have physical characteristics suitable for propellant additives.

Still another object of the present invention is to provide reaction products of tetramethyltetrazene with aluminum trialkyls and their amine complexes which may have use as components for explosives.

In accordance with the present invention a group of novel aluminum-nitrogen compounds were prepared by reacting tetraalkyltetrazenes with aluminum trialkyls and trialkylaluminum trimethylamine complexes. The reaction is accomplished by distilling one of the tetrazenes onto the selected aluminum trialkyl or its amine complex at −196° C. The reaction mixture is allowed to warm to room temperateure, then heated to a temperature ranging from 60°–80° C. for about 20 hours. The reaction mixture is now vacuum distilled at 60°–63° C. and the reaction product recovered.

The following examples serve to illustrate how the present invention may be carried out in practice; however, the invention is not restricted to the examples.

*Example I.—Triethylaluminum trimethylamine and tetramethyltetrazene*

By means of vacuum transfer 0.0261 mole of triethylaluminum trimethylamine were distilled onto 0.275 mole of tetramethyltetrazene at −196° C. The reaction mixture was allowed to warm to room temperature and was then heated at 60° C. for 20 hours. The resulting mixture was vacuum distilled (at 0.005 mm. Hg) at 60°–63° C. and a clear colorless liquid was obtained. The reaction may be represented as follows:

$(C_2H_5)_3Al:N(CH_3)_3 + (CH_3)_2N\text{—}N\text{=}N\text{—}N(CH_3)_2 \xrightarrow{60°\ C.}$
$(C_2H_5)_3Al:(CH_3)_2N\text{—}N\text{=}N\text{—}N(CH_3)_2 + N(CH_3)_3$ An elemental analysis of the product gave the following results which agreed with the formula:

$(C_2H_5)_3Al:(CH_3)_2N\text{—}N\text{=}N\text{—}(CH_3)_2$

Calculated: C, 52.14%; H, 11.82%; N, 24.33%; Al, 11.71%. Found: C, 50.87%; H, 12.01%; N, 25.44%; Al, 10.52%.

The yield of reaction product is approximately 50 mole percent. Methanol hydrolysis yields 3 moles of ethane for each formula weight of compound.

*Example II.—Triethylaluminum trimethylamine and tetramethyltetrazene at elevated temperatures*

Employing the same procedure described in Example I, with the exception that the reaction mixture was heated at 80° C. for 20 hours, an orange colored, viscous fluid was obtained. An elemental analysis of the product gave the following results which agreed with the formula, $C_4H_{10}AlN$:

Calculated: C, 48.47%; H, 10.17%; N, 14.13%; Al, 27.22%. Found: C, 48.20%; H, 10.99%; N, 14.0%; Al, 26.26%.

The formula

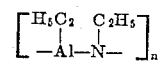

has been assigned to this material. The yield is approximately 30 mole percent of triethylaluminum trimethylamine.

*Example III.—Trimethylaluminum and tetramethyltetrazene*

By means of vacuum transfer (0.005 mm. Hg) 0.00243 mole of tetramethyltetrazene was placed on 0.0222 mole of trimethylaluminum dissolved in 25 ml. of n-pentane at −196° C. The reaction mixture was allowed to warm to room temperature (25° C.) and stand for 20 hours. The reaction is slow and the waiting period is necessary. If the solvent is removed prematurely, an explosion may occur. The pentane and any excess tetramethyltetrazene are pumped away and the resulting reaction mixture is vacuum distilled (0.005 mm. Hg) through at −15° C. trap at 25° C. Passage of the vapor through a −15° C. trap or over a −15° C. cold finger is necessary to remove some dimethyl aluminum dimethylamine that is formed. The product is a clear, mobile, colorless liquid which decomposes slowly at 15° C.

The reaction may be represented as follows:

$(CH_3)_3Al + (CH_3)_2NN\text{=}NN(CH_3)_2 \xrightarrow{25°\ C.}$
$(CH_3)_3Al:(CH_3)_2NN\text{=}NN(CH_{32})$ The following elemental analysis agrees with the formula $C_7H_{21}N_4Al$:

Calculated: C, 44.65%; H, 11.24%; N, 29.76%; Al, 14.32%. Found: C, 45.35%; H, 11.50%; N, 27.13%; Al, 13.93%.

Hydrolysis of the product gives 3 moles of methane for each formula weight of $C_7H_{21}N_4Al$ and two molecular weight determinations gave the values 199 and 193 (calculated for $C_7H_{21}N_4Al$: 188.2). The yield of this material is 80 mole percent based on trimethylaluminum.

An infrared spectrum and a proton resonance spectrum of this compound were also reported. The proton resonance spectrum indicated that the compound has a symmetric structure of the type

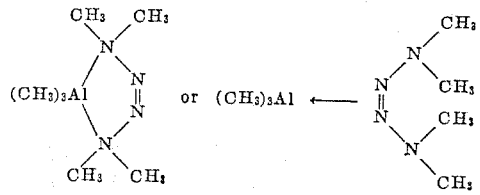

*Example IV.—Trimethylaluminum and tetramethyltetrazene at elevated temperature*

Using the same procedure described in Example III, but heating the crude reaction mixture at 90° C. for 3 hours, a viscous, dark red polymer was obtained which has some dimethylaluminum dimethylamine mixed with it. This material is purified by vacuum distillation at 60° C. and 0.010 mm. Hg.

The reaction may be represented by the following equation:

$$(CH_3)_3Al:(CH_3)_2NN=NN(CH_3)_2 \xrightarrow{90°C.}$$
$$\text{red polymer} + (CH_3)_2Al-N(CH_3)_2 + CH_4 + CH_3N_3 + N_2$$

The equation is not balanced but indicates only the products which are obtained from the reaction. The polymer is obtained in 50 weight percent yield.

An elemental analysis agrees with the formula $$C_5H_{15}N_2Al$$

Calculated: C, 46.13%; H, 11.62%; N, 21.52%; Al, 20.72%. Found: C, 47.90%; H, 10.88%; N, 20.40%; Al, 21.01%.

Hydrolysis of the polymer with water yields 3 moles of methane per formula weight of material, hence, the formula $(CH_3)_3Al[N_2(CH_3)_2]_n$ has been assigned to this material.

Various modifications are contemplated and may obviously be resorted to by those skilled in the art without departing from the spirit and scope of the invention as set forth in the appended claims.

What is claimed is:

1. A process for the preparation of aluminum-nitrogen compounds comprising distilling a tetramethyltetrazene onto an aluminum trialkyl seelcted from the group consisting of triethylaluminum trimethylamine and trimethylaluminum dissolved in pentane at about −196° C., warming to room temperature, then heating to a temperature of about 60° C. for 20 hours.

2. The compound having the formula $$(C_2H_5)_3Al:(CH_3)_2NN=NN(CH_3)_2$$

3. A process for the synthesis of the compound of claim 2 comprising distilling triethylaluminum trimethylamine onto tetramethyltetrazene at −196° C. whereby a reaction mixture is formed; warming said mixture to about 25° C., then heating at 60° C. for about 20 hours and vacuum distilling at about 60°–63° C.

4. The process for preparing the compound having the formula $C_4H_{10}AlN$ comprising distilling triethylaluminum trimethylamine onto tetramethyltetrazene at −196° C., whereby a reaction mixture results; heating said mixture at 80° C. for 20 hours until a viscous orange fluid forms.

5. The compound having the formula $$(CH_3)_3Al:(CH_3)_2NN=NN(CH_3)_2$$

6. The process for the synthesis of the compound of claim 5 comprising distilling tetramethyltetrazene onto trimethylaluminum dissolved in n-pentane at −196° C., whereby a reaction mixture results; warming said mixture to room temperature and maintaining at said temperature for about 20 hours, then vacuum distilling said mixture whereby a mobile colorless liquid is obtained.

7. The compound having the formula $$(CH_3)_3Al[N_2(CH_3)_2]_n$$

8. The process for the synthesis of the compound of claim 7 comprising reacting trimethylaluminum with tetramethyltetrazene dissolved in n-pentane at room temperature until a reaction mixture forms, then heating said mixture to about 90° C. for 3 hours until a viscous red product forms which is purified by vacuum distillation at 60° C.

References Cited by the Examiner

Erusalimskii et al., Chemical Abstracts, vol. 51, page 12841e (1957).

Ruff et al., J.A.C.S., vol. 82, pages 2141–2144 (1960).

TOBIAS E. LEVOW, *Primary Examiner.*

ABRAHAM H. WINKELSTEIN, *Examiner.*

I. R. PELLMAN, H. M. S. SNEED, *Assistant Examiners.*